US010340060B1

(12) United States Patent
Sharpless et al.

(10) Patent No.: US 10,340,060 B1
(45) Date of Patent: Jul. 2, 2019

(54) OVERCURRENT PROTECTION DEVICES AND CIRCUITS FOR SHIELDED CABLES

(71) Applicant: RIMKUS CONSULTING GROUP, INC., Houston, TX (US)

(72) Inventors: Samuel L. Sharpless, Altamonte Springs, FL (US); George E. Smith, Gastonia, NC (US)

(73) Assignee: RIMKUS CONSULTING GROUP, INC., Houston, TX (US)

( * ) Notice: Subject to any disclaimer, the term of this patent is extended or adjusted under 35 U.S.C. 154(b) by 0 days.

(21) Appl. No.: 15/982,103

(22) Filed: May 17, 2018

(51) Int. Cl.

| | |
|---|---|
| ***H01H 85/00*** | (2006.01) |
| ***H01H 85/20*** | (2006.01) |
| ***H01H 85/46*** | (2006.01) |
| ***H02H 3/16*** | (2006.01) |
| ***H02H 3/22*** | (2006.01) |
| ***H01B 11/18*** | (2006.01) |
| ***H01R 9/05*** | (2006.01) |
| ***H01R 13/62*** | (2006.01) |
| ***H01R 31/02*** | (2006.01) |
| ***H01R 24/44*** | (2011.01) |
| *H01R 24/52* | (2011.01) |

(52) U.S. Cl.
CPC ........... *H01B 11/18* (2013.01); *H01R 9/0512* (2013.01); *H01R 13/62* (2013.01); *H01R 24/44* (2013.01); *H01R 31/02* (2013.01); *H01R 24/52* (2013.01)

(58) Field of Classification Search
CPC ........ H01H 85/00; H01H 85/20; H01H 85/41; H01H 85/46; H02H 3/16; H02H 3/22
USPC .......... 174/68.1; 361/50, 104, 111, 118, 124; 337/31, 34, 159
See application file for complete search history.

(56) References Cited

U.S. PATENT DOCUMENTS

| | | | | |
|---|---|---|---|---|
| 2,798,113 A | | 7/1957 | Koller et al. | |
| 3,351,813 A | * | 11/1967 | Trout | H02H 3/162 327/325 |
| 3,927,353 A | * | 12/1975 | Reid | H01H 85/46 361/104 |
| 4,144,404 A | | 3/1979 | De Groef et al. | |
| 4,335,415 A | * | 6/1982 | Hooberry | H01H 85/2045 337/31 |
| 4,591,216 A | | 5/1986 | McClune | |
| 5,053,910 A | * | 10/1991 | Goldstein | H02H 9/005 333/206 |

(Continued)

*Primary Examiner* — Xiaoliang Chen
(74) *Attorney, Agent, or Firm* — Marshall, Gerstein & Borun LLP

(57) ABSTRACT

Overcurrent circuits are disclosed for preventing overcurrent in shielded coaxial communication cables. A shield breaking element of an overcurrent circuit is adaptable to be coupled in series with a shield conductor of a shielded coaxial cable, and is also configured to open upon conducting a first electrical current that exceeds an overcurrent threshold, thereby preventing the first electrical current from flowing through the shield conductor of a shielded coaxial cable. A signal breaking element of the overcurrent circuit is adaptable to be coupled in series with a signal conductor of the shielded coaxial cable, and is configured to open when the shield breaking element opens thereby preventing a second electrical current from flowing through the signal conductor. Systems and devices that use the overcurrent circuits, for example, to provide alerts and status, are also disclosed.

24 Claims, 9 Drawing Sheets

(56) References Cited

U.S. PATENT DOCUMENTS

| | | | | | |
|---|---|---|---|---|---|
| 5,625,521 | A * | 4/1997 | Luu | H02H 9/042 361/111 |
| 5,726,851 | A * | 3/1998 | Knapp | H01H 85/041 337/159 |
| 6,043,663 | A * | 3/2000 | Kapusta | G01R 31/021 324/539 |
| 6,530,808 | B1 | 3/2003 | Hosler, Sr. et al. | |
| 2008/0062606 | A1 * | 3/2008 | Brown | H02H 9/042 361/111 |
| 2008/0137821 | A1 * | 6/2008 | Ho | H04L 12/2801 379/90.01 |
| 2014/0273620 | A1 | 9/2014 | Burris | |

* cited by examiner

OVERCURRENT PROTECTION DEVICES AND CIRCUITS FOR SHIELDED CABLES

FIELD OF THE DISCLOSURE

The present disclosure generally relates to overcurrent protection devices, more particularly, to an overcurrent protection device for prevention of overcurrent, overheating, and/or fire in shielded cables and/or shielded cable networks.

BACKGROUND

Conventional shielded communication cables generally have one or more inner "signal" conductors which are surrounded by an outer conductor known as a "shield." The signal conductor(s) and the shield conductor are separated by a dielectric medium. This construction ensures efficient transmission of signals via the signal conductor(s) with little or no signal leakage outside the shield conductor. Additionally, this construction greatly reduces external electrical noise from interfering with the signal conductor(s).

Communication subscriber services, for example, cable television, Internet, digital telephone, digital data, etc., may use such conventional shielded communication cables and/or connectors in a variety of applications. For example, at each subscriber location, a shielded cable commonly forms a connection between the subscriber's service point and the provider's communications network. To provide safe and efficient operation, the shield conductor for the shielded cable may be connected to the subscriber's building/facility electrical grounding system at one end and to the communication system provider's network grounding system at the other end. In turn, the communication system provider's network grounding system is generally connected to electrical utility grounding system. Hence, the cable shield assembly of conventional shielded communication cable in a typical communication system forms an electrical connection between the subscriber's building electrical grounding system and the electrical utility grounding system.

Historically, coaxial shields of shielded communication cables do not have overcurrent protection because it is presumed that overcurrent protection is already in place for the associated signal conductors of the shielded communication cables, which also provides such protection for returning currents for the shield conductors.

Electrical utility power in the United States is typically provided with a grounded neutral conductor. The neutral conductor for electrical service to a building is connected to the building electrical grounding system at one end and to the electrical utility's network grounding system at the other end. On a building which is also served by shielded communication subscriber service cable(s), such an arrangement results in an unintended parallel path for electrical utility neutral currents on the communications cable shield. Consequentially, some amount of unintended utility neutral current will always flow on the communications system shield. These shield currents (objectionable currents) are commonly small and usually go unnoticed. However, if discontinuities or poor connections occur in the electrical system neutral conductor, significant objectionable current may then flow on the communications cable shield, easily exceeding what the communications cable shield assembly can safely carry. This results in a significant risk of fire, or damage (e.g., to the network itself or to equipment/wiring inside the subscriber's premises), due to dangerous electrical overheating of the communications cable shield.

The coaxial shield overcurrent, as described above, may be a symptom of another serious problem with the building electrical system, i.e., the discontinuities or poor connections in the electrical system neutral conductor. In such a circumstance, even if the shield overcurrent hazards are somehow remedied, it would not alleviate the underlying problem in the neutral conductor (which also carries serious potential risk of fire or electric shock). Hence, elimination of the overcurrent flow in the shield conductor may resolve one dangerous condition (the risk of fire or damage from overheating in the shield conductors), but it does not eliminate the substantial risk of fire or electrical shock elsewhere that can result from discontinuities or poor connections in the electrical system neutral conductor.

Hence, there is an unresolved need for a circuit, a device, and/or a system for preventing overcurrent currents in shielded coaxial communication cable assemblies and related networks.

BRIEF SUMMARY

A circuit (referred to herein as an "overcurrent circuit"), and devices and systems that incorporate the overcurrent circuit, are disclosed herein that address the above-mentioned need for a circuit, a device, and/or a system for preventing overcurrent in one or more shielded coaxial communication cables and related networks. In various embodiments, a circuit of the present disclosure may be configured to break the electrical continuity of a communications cable shield conductor (also referred to herein as a "cable shield circuit") in response to objectionable current flow in the subject shield conductors. For example, the overcurrent circuit may include a shield breaking element that breaks the current flow through a cable shield conductor and/or a cable shield conductor assembly based on an overcurrent flowing through the shield breaking element being greater than an overcurrent threshold, level, or value, thereby preventing, for example, overcurrent damage to one or more shielded communication cables, and/or prevent or eliminate the risk of fire due to electrical overheating of the communications cable shield(s).

In additional embodiments, the break caused by the shield breaking element may further cause an additional break in the current flow through one or more signal elements of the corresponding shielded coaxial communication cable(s), thereby preventing current flow through the one or more shielded coaxial communication cables' corresponding signal conductors (also referred to herein as "cable signal circuits"). For example, in some embodiments, in may be desirable that an overcurrent circuit, as disclosed herein, upon breaking the shield circuit, simultaneously break one or more signal circuit(s) via a corresponding signal breaking element to thereby prevent or stop signal conductance through one or more shielded coaxial communication cable(s) and/or shielded coaxial communication cable assemblies(s) coupled to the overcurrent circuit.

As described herein, additional embodiments may include device(s) that include or incorporate the disclosed overcurrent circuit. For example, for various embodiments, the several devices may include a case, connectors, and/or other components that may utilize, provide, or otherwise allow use of the overcurrent circuit of the present disclosure. Such devices may include or incorporate amplifiers, splitters, taps, combiners, switches, grounding blocks, and other such devices that may be used in conjunction with the disclosed overcurrent circuit for shielded communications cables.

In some embodiments, a break in the disclosed shield circuit and/or signal circuit(s) may cause the generation of a notification, alert, or indication that shield protection has activated. For example, in some embodiments, a break, in the shield circuit and/or signal circuit(s), may alert an operator or subscriber that an overcurrent situation has occurred. In still further embodiments, an overcurrent device may provide a visual, mechanical, electrical, electromagnetic, or other indication, alerts, status, or similar indication or alert of overcurrent circuit activation, shield break, signal element break, or other operations or functionalities described disclose herein. Such indications or alerts may be useful because coaxial cable shield overcurrent(s), or even breaks in the shield conductor, may not always cause an immediate noticeable loss of signal to the coaxial system user, subscriber, or otherwise, without such indications. Moreover, such indications or alerts may be critical in determining, perhaps preemptively, a problem, expected problem, or otherwise malfunction in an electrical system. For example, in such an embodiment, the action of breaking the signal conductors or circuits may cause the user to notify the system operator of an outage and thereby an opportunity for the system operator to discover and identify the underlying problem relating to the electrical system malfunction, e.g., relating to the neutral, grounding problem, etc.

In still further embodiments, the status (e.g., the current or voltage) of a shielded coaxial communication cable may be monitored by an overcurrent monitoring system for monitoring overcurrent in one or more shielded coaxial communication cables. For example, in one embodiment data as to the status (e.g., the signal, current, or voltage) may be tracked and visualized via a computing device (e.g., a user mobile device). Other status may include a status indicators or values (e.g., the number of overcurrent events, overcurrent locations, alert status, etc.) to indicate whether either, both, or none of the shield breaking element and/or signal breaking element have been activated, e.g., as caused by an objectionable overcurrent event as described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
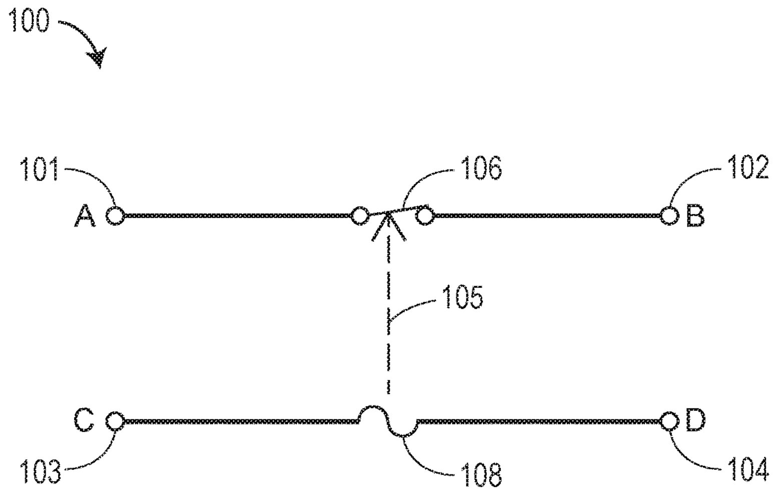
FIG. 1 illustrates a schematic electrical diagram of an embodiment of an overcurrent circuit in accordance with the present disclosure.
Figure 2:
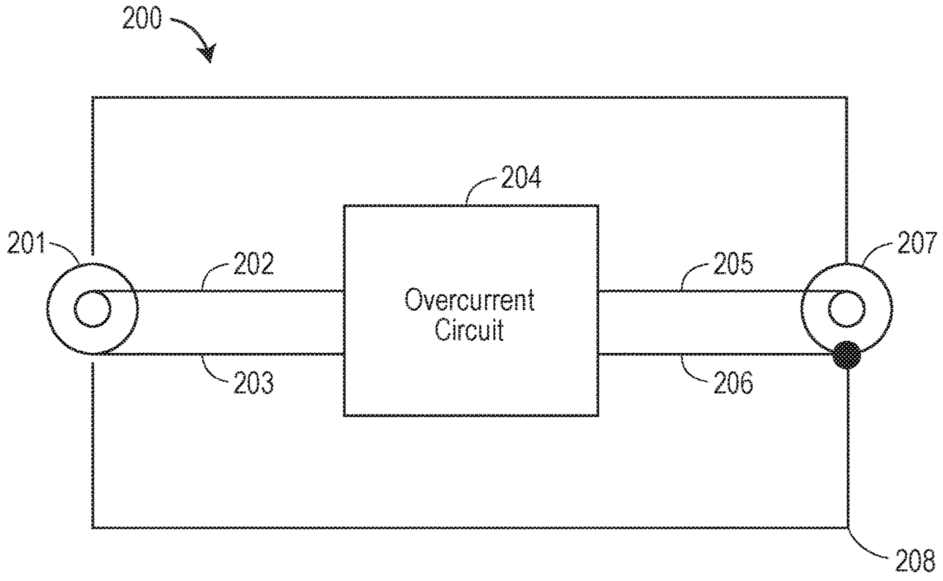
FIG. 2 illustrates a block diagram of a functional overcurrent protection device that includes the overcurrent circuit of FIG. 1 in accordance with the present disclosure.

FIG. **5*a* illustrates a perspective view of an overcurrent device, which is an embodiment the overcurrent protection device of FIG. 2, and that includes the overcurrent circuit of FIG. 1** in accordance with the present disclosure.

Figure 5A:
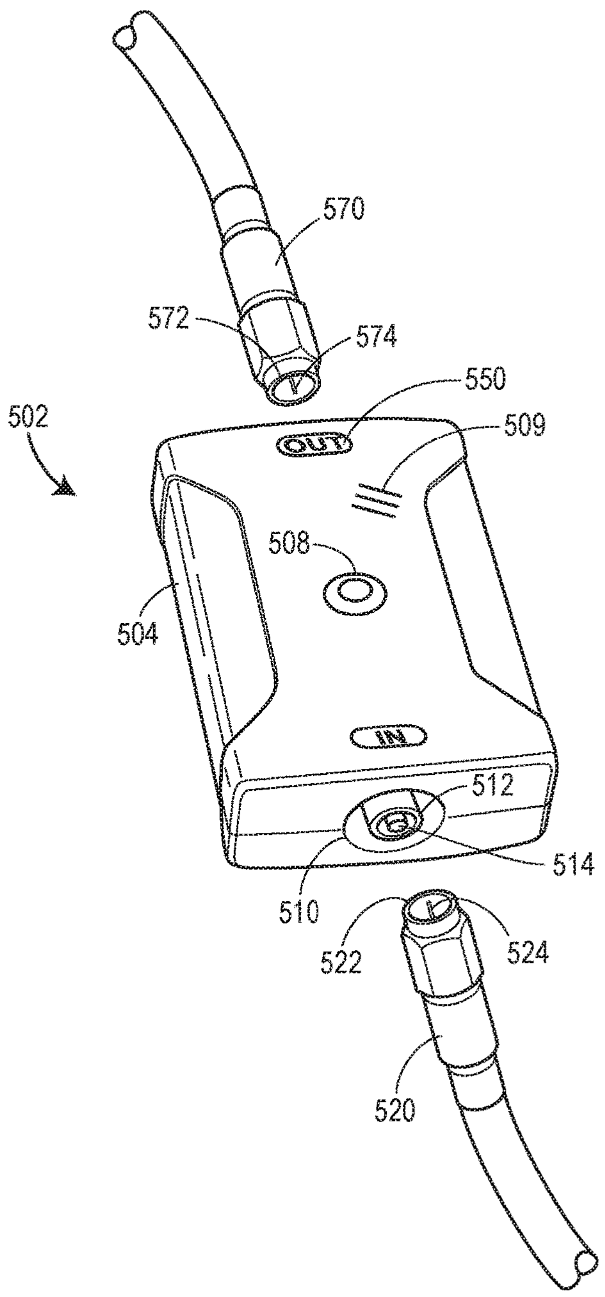

FIG. **5*b* illustrates a perspective view of an example shielded coaxial communication cable, such as those depicted in FIG. 5*a***, and in accordance with the present disclosure.

FIG. **6*a*** illustrates an example network diagram including an overcurrent monitoring system in accordance with the present disclosure.

Figure 6A:
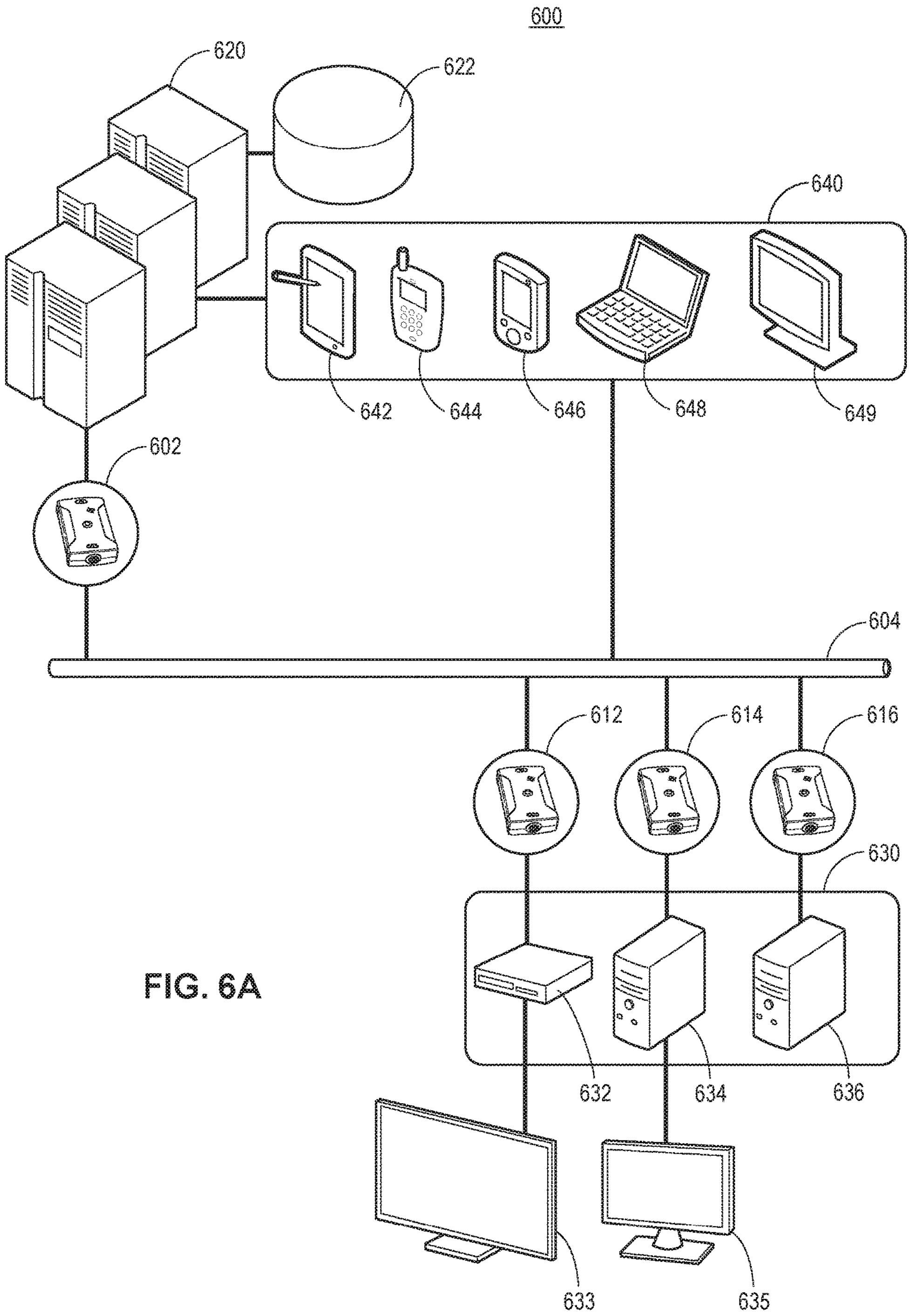

FIG. **6*b* illustrates an embodiment of a server of the overcurrent monitoring system of FIG. 6*a***.

Figure 7:
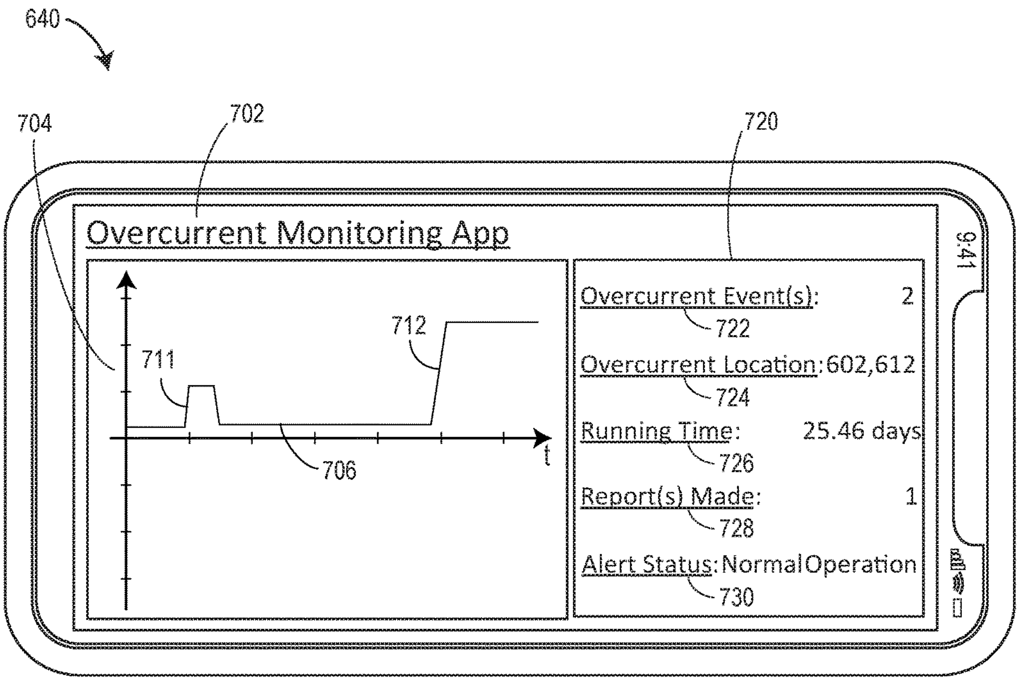

FIG. 7 illustrates an embodiment of a computing device executing an overcurrent monitoring application (app) in accordance with the present disclosure.

The Figures depict preferred embodiments for purposes of illustration only. Alternative embodiments of the systems and methods illustrated herein may be employed without departing from the principles of the invention described herein.

DETAILED DESCRIPTION

FIG. 1 illustrates a schematic electrical diagram of an embodiment of an overcurrent circuit 100 in accordance with the present disclosure. In this embodiment, signal conductor element 101 (e.g., a signal input) is connected to signal conductor element 102 (e.g., a signal output) via normally closed signal breaking element 106 (also referred to herein as a "switching element"). In addition, shield conductor element 103 (e.g., a shield input) is connected to shield conductor element 104 (e.g., a shield output) via shield breaking element 108. When current through shield breaking element 108 (also referred to herein as an "overcurrent element") exceeds an overcurrent threshold or value, it opens, stopping current flow from 103 to 104.

When the shield breaking element 108 opens, an interlocking element 105 may open the normally closed signal breaking element 106, thereby breaking current flow from 101 to 102, and fully disconnecting the coaxial communication signal. In various embodiments, interlocking element 105 may be an electrical, electromagnetic, electromechanical, or similar component or element, including, for example, a relay or similar component. In some embodiments, the opening of the shield breaking element 108 and/or the signal breaking element 106 may alert a communications system user or operator of a potentially dangerous condition. For example, in some embodiments, when signal breaking element 106 opens corresponding signal connection(s) of coaxial cables (as shown for 101/102/106) users, operators, and/or others may be notified of a potentially unsafe condition which initiated opening of the shield breaking element 108. As described herein, the notification may be any of visual, mechanical, electrical, or electromagnetic to indicate that the overcurrent circuit has activated. In some embodiments an alert or notification may be part of the system or network in which a shielded coaxial communication cable is installed, where, for example, an activation (e.g., opening) of a signal breaking element associated with a shielded coaxial communication cable causes signal or network interruption. As a result, users, operators, and/or others may be able to detect the interruption via the system or network. In some embodiments, as described herein, a monitoring system may monitor the signals or currents of the network indicate the location, identifier, or other information about the activated shielded communication cable(s).

For clarity, FIG. 1 shows only one overcurrent circuit with a single set of signal conductors (101 and 102) and with a single signal breaking element 106. However, it is to be understood that the circuits, devices, and/or other disclosure herein may include opening one or more signal conductors that relate to, are included with, or are other associated with the overcurrent circuit. For example, in some embodiments, a coaxial cable may have multiple signal conductors with multiple respective signal breaking elements that are configured to open when a single, corresponding shield breaking element opens.

In addition, while FIG. 1 depicts shield breaking element 108 and signal breaking element 106 coupled between two shielded coaxial communication cables, of 101/103 (e.g., a first shielded coaxial communication cable) and 102/104 (e.g., a second shielded coaxial communication cable) respectively, shield breaking element 108 and signal breaking element 106 may also, in certain embodiments, be part of a device, component, connector, or as a separate part that snaps in-line with a single shielded coaxial communication cable.

In routine practice, normal currents flowing through a coaxial cable shield of a shielded coaxial communication cable may be at such low levels that the shielded coaxial communication cable (e.g., comprised of 101/103 or 102/104) are not damaged. However, if objectionably high levels of current begins to flow on shielded conductors 103 and/or 104 (and as a consequence, shield breaking element 108), the shielded coaxial communication cables, of 101/103 (e.g., a first shielded coaxial communication cable) and 102/104 (e.g., a second shielded coaxial communication cable) respectively, can overheat, catch fire or be damaged. Thus, the overcurrent circuit 100 described for FIG. 1 is configurable for detecting objectionable current that is above an overcurrent safety level, threshold, or value in the shielded coaxial communication cables, thereby preventing the shielded coaxial communication cables, components thereof, and/or related circuit components disclosed herein, from overheating and becoming the source of a fire or damage. Thus, for example, the shield breaking element 108, which is in series with the shield conductors of two coaxial cables (e.g., 101/103 and 102/104, respectively), may prevent overcurrent damage to the related coaxial communication cable shields, other components thereof, etc. In some embodiments, the shield breaking element 108 may be configured to detect and/or open at low currents, low voltages, or other similar minimal values detected or experienced by the shield breaking element 108 or otherwise overcurrent circuit 100 as described herein. For example, the shield breaking element 108 and/or overcurrent circuit 100 may be configured detect and/or open at low currents (e.g., less than 1 ampere), low voltages (e.g., less than 1 volt), or other similar minimal values through implementation of, setting of, or use of sensitive mechanical, digital, electronic relay(s) or other sensitive component (s), which may be any of the types of relay(s) or similar component(s) as described herein.

In other embodiments, the shield breaking element 108 may be configured to detect and/or open at high currents, high voltages, high temperatures or other similar high values detected or experienced by the shield breaking element 108 or otherwise overcurrent circuit 100 as described herein. For example, the shield breaking element 108 and/or overcurrent circuit 100 may be configured detect and/or open at high currents (e.g., greater than 10 amperes), high voltages (e.g., greater than 10 volts), high temperatures (e.g., greater than 100 degrees Celsius) or other similar high values through implementation of, setting of, or use of sensitive mechanical, digital, electronic relay(s) or other sensitive component (s), which may be any of the types of relay(s) or similar component(s) as described herein.

In certain embodiments the overcurrent threshold of the overcurrent circuit may be configurable or adjustable. In such embodiments, for example, the overcurrent threshold of the overcurrent circuit may be configured at certain values (e.g., between 0.1 to 10 amperes), such that overcurrent circuit is configured to open or break the electrical continuity of the communications cable shield conductor when the overcurrent threshold is reached.

In various embodiments, the overcurrent threshold of the overcurrent circuit may be predefined or, in the alternative, dynamically adjustable or configurable. For example, in some embodiments, the overcurrent threshold may be predefined by manufacture or by use of an overcurrent circuit with a certain relay(s) that is configured to activate at certain detected values (e.g., amperes) flowing through a coaxial communication cable shield. In other embodiments, the overcurrent threshold may be dynamically adjustable or configurable by use or incorporation of an adjustable relay, such as a digital/transistor-based relay as described herein, that is able to adjust its overcurrent threshold, and, therefore, activate, based on certain detected values (e.g., amperes) flowing through a coaxial communication cable shield.

In some embodiments, the overcurrent threshold may be configured only as high as necessary to prevent nuisance activation (e.g., activation caused by very low or non-damaging currents).

In other embodiments, the overcurrent threshold may be configured to provide a heighted measure of safety. For example, in certain embodiments, connections and/or connectors associated with the overcurrent circuit may be rated at lower ampere or current ratings (if they exist at all) than the overcurrent circuit itself, such that the connections and/or connectors may become overheated at lower ampere or current ratings. For example, currents as low as one ampere may cause overheating on a loose or otherwise low rated connection and/or connector. In such cases, the overcurrent threshold may be configured at a low value to prevent overheating.

More generally, however, the overcurrent threshold may be set according to any specific application within which, or for, the overcurrent circuit is installed or otherwise used.

For example, in at least one embodiment, overcurrent circuit 100 prevents overcurrent in a shielded coaxial communication cable (e.g., 102/104). The shield breaking element 108 is adaptable to be coupled in series with a shield conductor (D) of a shielded coaxial cable 102/104. The shield breaking element 108 is configured to open upon conducting a first electrical current of the shield conductor (D) that exceeds an overcurrent threshold thereby preventing the first electrical current from flowing through the shield conductor (D) of a shielded coaxial cable 102/104. In addition, signal breaking element 106 is adaptable to be coupled in series with a signal conductor (B) of the shielded coaxial cable 102/104, wherein the signal conductor (B) is operable to conduct a second electrical current of signal conductor (B). The signal breaking element 106 configured to open when the shield breaking element 108 opens. The opening of the signal breaking element 106 prevents the second electrical current from flowing through the signal conductor (B).

In various embodiments, any of the shield breaking element 108, the signal breaking element 106, or interlocking element 105 may be a switch, an electrical, electromagnetic, electromechanical, or similar component that includes a switch, and/or an electrical, electromagnetic, electromechanical, or similar component that may be used as a switch. For example, in certain embodiments, any of the shield breaking element 108, the signal breaking element 106, or interlocking element 105 may be implemented as a relay or combination of relays and/or other components, which may include any one or more of an electromechanical relay, latching relay, non-latching relay, and/or a reed relay. In other embodiments one or more transistors may comprise any one or more of the shield breaking element 108, the signal breaking element 106, and/or interlocking element 105, which may include, for example, a solid state relay, a field-effect transistor (FET) switch. Other embodiments may utilize a digital protective relay, or a numeric protective relay, where such relays may use a microprocessor to analyze power system voltages, currents or other process quantities, for the purpose of detecting of overcurrent, other information, data values, etc. as described herein.

For example, in one embodiment, where the shield breaking element 108 is implemented as a relay, a current flowing through cable shielding of one or more shielded coaxial communication cables, for example, of 101/103 (e.g., a first shielded coaxial communication cable) and 102/104 (e.g., a second coaxial shielded communication), may be provided as an input to the relay. When a sufficient current (e.g., an overcurrent) flows into the relay circuit, the relay may activate causing the shield breaking element 108 to open, and thus the interlocking element 105 and signal breaking element to 106 to activate respectively, as disclosed herein.

Figure 3:
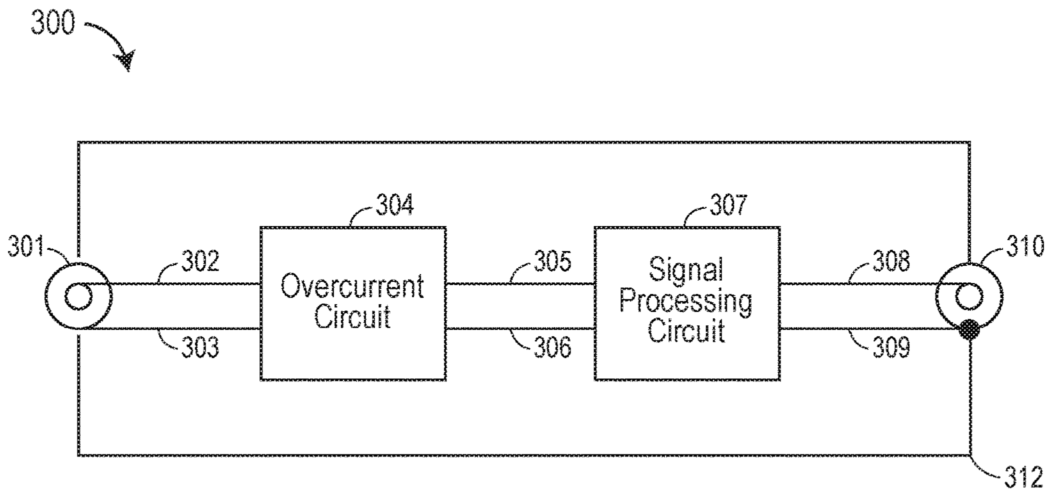
FIG. 3 illustrates a block diagram of a coaxial signal processing device that includes the overcurrent circuit of FIG. 1 in accordance with the present disclosure.
Figure 4:
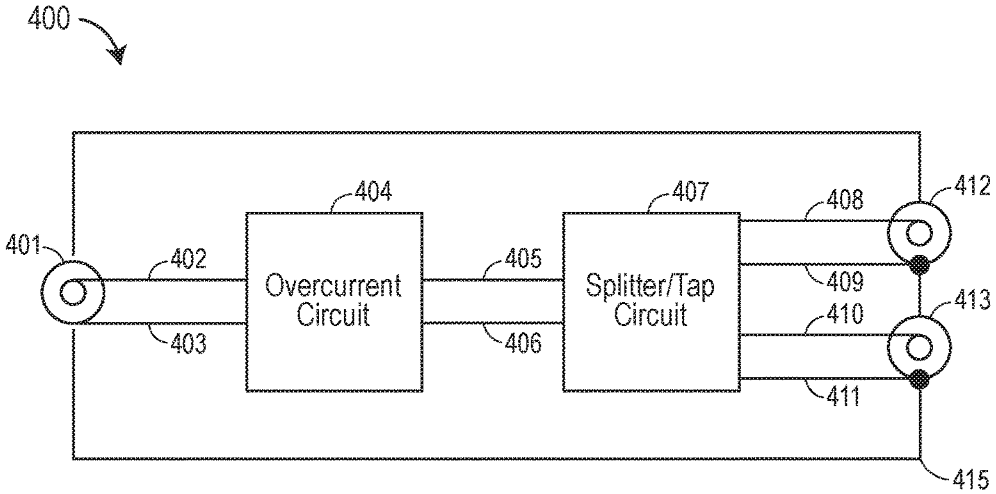
FIG. 4 illustrates a block diagram of a signal splitter or tap device that includes the overcurrent circuit of FIG. 1 in accordance with the present disclosure.

In various embodiment, as exemplified in FIGS. 2-4, the overcurrent circuit 100 in FIG. 1 may be added to, included or incorporated in, or otherwise associated with new or existing devices, circuits, or components to provide circuit protection by preventing objectionable current flow when dangerous current levels begin to flow as described herein.

FIG. 2 illustrates a block diagram of a functional overcurrent protection device 200 that includes the overcurrent circuit 100 of FIG. 1 in accordance with the present disclosure. In the embodiment of FIG. 2, the overcurrent circuit 204 (which includes the overcurrent circuit 100, as described for FIG. 1) has signal input 202 and shield input 203 of coaxial input element 201 (e.g., a coaxial input connector). The output of the overcurrent circuit 204 is connected to a coaxial output element 207 (e.g., a coaxial output connector) having a signal output 205 and shield output 206. The entire assembly may be contained by a conductive shield or case 208 which is electrically connected to the shield input 203 or the shield output 206. As further described herein, FIG. 5*a* illustrates a perspective view of an overcurrent device 502, which is an embodiment the overcurrent protection device 200 of FIG. 2, and that includes the overcurrent circuit 100 of FIG. 1 in accordance with the present disclosure.

Each of the coaxial input element 201 and coaxial output element 207 may be connected to a shielded coaxial communication cable. An example shielded coaxial communication cable is described herein for FIG. 5*b*.

FIG. 3 illustrates a block diagram of a coaxial signal processing device 300 that includes the overcurrent circuit 100 of FIG. 1 in accordance with the present disclosure. In this embodiment, the overcurrent circuit 304 (which includes the overcurrent circuit 100, as described for FIG. 1) has signal input 302 and shield input 303 of coaxial input element 301 (e.g., a coaxial input connector). The output of the subject circuit 304 is connected to signal processing circuit 307 via signal conductor 305 and shield conductor 306. The signal processing circuit 307 outputs are connected to the coaxial output element 310 having a signal output 308 and shield output 309. The entire assembly is contained by a conductive shield or case 312 which is electrically connected to the shield input 303 or the shield output 309.

Each of the coaxial input element 301 and coaxial output element 310 may be connected to a shielded coaxial communication cable. Thus, in embodiments using the coaxial signal processing device 300 of FIG. 3, the signal processing circuit 307 is electrically connected in series with a first shielded coaxial communication cable (e.g., connected via input element 301) and a second shielded coaxial communication cable (e.g., connected via output element 310). In various embodiments, the signal processing circuit 307 may be configured to provide any one or more of signal amplification, signal attenuation, impedance matching, and/or protocol conversion, to a signal passing from the first shielded coaxial communication cable to the second shielded coaxial communication cable or vice versa.

FIG. 4 illustrates a block diagram of a signal splitter or tap device 400 that includes the overcurrent circuit 100 of FIG. 1 in accordance with the present disclosure. In this embodiment, the overcurrent circuit 404 (which includes the overcurrent circuit 100, as described for FIG. 1) has signal input 402 and shield input 403 of coaxial input element 401 (e.g., a coaxial input connector). The output of the subject circuit 404 is connected to the splitter or tap circuit 407 via signal conductor 405 and shield conductor 406. The tap or splitter circuit 407 outputs are connected to multiple coaxial output elements/connectors 412 and 413 by signal outputs 408 and 410 respectively, and by shield outputs 409 and 411 respectively. The entire assembly is contained by a conductive shield or case 415 which is electrically connected to either the shield input 403 or the shield outputs 409 and 411.

While the signal splitter or tap device 400 of FIG. 4 depicts connection to only two splitter or tap outputs, it is to be understood that the splitter or tap circuit 407 in this application may have any number of inputs and/or outputs.

The signal splitter or tap device 400 of FIG. 4 may provide splitting or tapping of signals. For example, a tap device (e.g., a splitter or tap device 400) may be used when a certain shielded coaxial cable needs to supply sources (e.g., a first set of televisions or related equipment) in one location and then continue downstream to one or more locations (e.g., a second set of televisions or related equipment). For example, a shielded coaxial cable (e.g., a "trunk) may connect to a tap (e.g., a splitter or tap device 400) to supply a block of four rooms. A shielded coaxial cable connected to the output side of the tap may run to a next block of four rooms where another tap (e.g., a splitter or tap device 400) may be inserted, and so on. Typically, taps nearer the first tap device in a chain may have a higher attenuation than those further down the chain. In some embodiments, the splitter processing circuit 407 may also be configured to provide additional functionality, such as signal processing to a signal or current between two or more coaxial cables of the splitter or tap device 400, including, for example, any of signal amplification, signal attenuation, impedance matching, or protocol conversion to the signal or current.

The splitter or tap device 400 may also provide splitting. A splitter-based device (e.g., splitter or tap device 400) may operate to divide the input to two or more outputs.

FIG. 5*a* illustrates a perspective view of an overcurrent device 502, which is an embodiment the overcurrent protection device 200 of FIG. 2, and that includes the overcurrent circuit 100 of FIG. 1 in accordance with the present disclosure. As described with respect to overcurrent circuit 100, overcurrent device 502 may prevent overcurrent in shielded coaxial communication cables. Overcurrent device 502 includes an input element 510 having a shield input 512 and a signal input 514. The input element 510 is adapted to receive a first shielded coaxial communication cable 520 having a first shield conductor 522 and a first signal conductor 524.

Overcurrent device 502 also includes an output element 550 having a shield output (not shown) and a signal output (not shown). The output element 550 is adapted to receive a second shielded coaxial communication cable 570 having a second shield conductor 572 and a second signal conductor 574.

An overcurrent circuit 100, as described with respect to FIG. 1, is included as part of overcurrent device 502. The overcurrent circuit of overcurrent device 502 includes a shield breaking element and a signal breaking element, each as described herein for FIG. 1. In the embodiment of overcurrent device 502, a shield breaking element (not shown) is coupled between the shield input 512 of the input element 510 and the shield output (not shown) of the output element 550. As for overcurrent circuit 100, the shield breaking element of overcurrent device 502 is configured for electrical connection in series between the first shield conductor 522 of the first shielded coaxial communication cable 520 and the second shield conductor 572 of the second shielded coaxial communication cable 570.

The overcurrent circuit of overcurrent device 502 also includes a signal breaking element. The signal breaking element of overcurrent device 502 is coupled between the signal input 514 of the input element 510 and the signal output (not shown) of the output element 550. Thus, the signal breaking element of overcurrent device 502 is configured for electrical connection in series between the first signal conductor 524 of the first shielded coaxial communication cable 520 and the second signal conductor 574 of the second shielded coaxial communication cable 570.

Similarly, as described for the overcurrent circuit 100, the shield breaking element of overcurrent device 502 is configured to open upon conducting a first electrical current that exceeds an overcurrent threshold. The opening of the shield breaking element of overcurrent device 502 prevents the first electrical current from flowing through the first shield conductor 522 of the first shielded coaxial communication cable 520 and the second shield conductor (not shown) of the second shielded coaxial communication cable 570.

Similarly, as described for the overcurrent circuit 100, the signal breaking element of overcurrent device 502 is configured to open when the shield breaking element of overcurrent device 502 opens, e.g., via an interlocking element 105 (not shown). The opening of the signal breaking element of overcurrent device 502 prevents a second electrical current from flowing through the first signal conductor 524 of the first shielded coaxial communication cable 520 and the second signal conductor (not shown) of the second shielded coaxial communication cable 570.

In some embodiments, the overcurrent device 502 may include a notification element 508 or 509. The notification element 508 or 509 may be configured to indicate that at least one of the opening of the shield breaking element overcurrent device 502 or the opening of the signal breaking element overcurrent device 502 has occurred. For example, in the embodiment of FIG. 5*a*, notification elements 508 and 509 are implemented as a visual indicating light emitting diode (LED) 508 and an electrical audio device 509. For example, upon the opening of the shield breaking element overcurrent device 502 or the opening of the signal breaking element overcurrent device 502, the LED 508 may turn to an "on" state thereby illuminating the LED 508 and, thus, indicating that an overcurrent has occurred in the overcurrent device 502. Similarly, for example, upon the opening of the shield breaking element overcurrent device 502 or the opening of the signal breaking element overcurrent device 502, the audio device 509 may emit a noise thereby alerting those in the vicinity of the overcurrent device 502 and, thus, indicating that an overcurrent has occurred in the overcurrent device 502. It should be appreciated that notification elements 508 and 509 are exemplary, and that a notification element may include any one or more of a similar visual indicating element, a mechanical indicating element, an electrical indicating element, and/or an electromagnetic indicating element.

In additional embodiments, overcurrent device 502 may include a conductive case 504 configured to at least partially contain the shield breaking element and the signal breaking element, each as included as part of the overcurrent device 502, as described herein. In still further embodiments, the conductive case 504 may at least partially expose the output element 550 for receiving the second shielded coaxial communication cable 570. The conductive case 504 may also at least partially expose the input element 510 for receiving the first shielded coaxial communication cable 520. The conductive case 504 may further be electrically connected to the shield input 512 or the shield output (not shown).

In some embodiments, overcurrent device 502 may be implemented as a multi-coaxial shielded communication device, for example, where such multi-coaxial shielded communication device implements the signal splitter or tap device 400 of FIG. 4. In such an embodiment, overcurrent device 502, for example, may include a second output element (not shown) having a second shield output (not shown) and a second signal output (not shown). Such second output element would be adapted to receive a third shielded coaxial communication cable (not shown) having a third shield conductor (not shown) and a third signal conductor (not shown). A splitter or tap circuit, as described for FIG. 4, may be electrically connected in series with the shield breaking element and the signal breaking element of the alternative embodiment for the overcurrent device 502. In such embodiment, the splitter or tap circuit may be configured to receive a signal from the first shielded coaxial communication cable 520 and transmit the signal to each of the second shielded coaxial communication cable 570 and the third coaxial shielded communication (not shown).

In certain embodiments, the overcurrent device 502 may include a microprocessor that is electronically connected to each of the shield breaking element and the signal breaking element. The overcurrent device 502 may also include a transmitter electronically connected to the microprocessor. In such embodiments, the microprocessor may be configured to transmit, via the transmitter to a network, one or more data values. The one or more data values may correspond to, or at least be associated with, the first electrical current or the second electrical current flowing through the first shielded coaxial communication cable 520 and the second shielded coaxial communication cable 570.

In still further embodiments, the one or more data values transmitted by the overcurrent device 502 may be operable to be received by one or more remote processors (e.g., remote computing devices, such as servers or mobile devices as described further herein). The one or more remote processors may be configured to generate an alert upon determining, based on one or more data values, which either the shield breaking element or the signal breaking element of the overcurrent device 502 has opened. In some embodiments, the one or more data values may be received by the remote processors, where such remote processors may be configured to visualize on a display (e.g., a display of a computing device, such as a mobile device) either the first electrical current or the second electrical current based the one or more data values. The remote processors may further be configured to visualize, on the display, status values determined from the one or more data values (e.g., any of the number of overcurrent events, overcurrent locations, running time, reports made, alert status, or any other such status as determinable from the one or more data values transmitted by the overcurrent device 502). The one or more data values may be stored in a remote storage device (e.g., server memory and/or a database, as described herein).

Figure 5B:
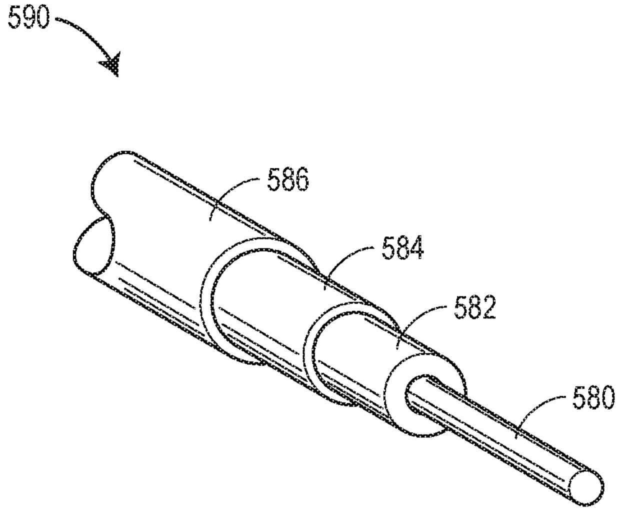

FIG. 5*b* illustrates a perspective view of an example shielded coaxial communication cable, such as those depicted in FIG. 5*a*, and in accordance with the present disclosure. As shown in FIG. 5*b*, shielded coaxial communication cable 590 includes a shield conductor 584. Shield conductor 584 may generally be a metallic shield, which may be comprised of aluminum, copper, or any other metal for shielding signal wires. Shield conductor 584 may also be solid, braided, stranded, or otherwise. Shield conductor 584 is separated from a signal conductor 580 by an insulated, non-conducting, or otherwise dielectric sheath 582, which may be comprised of, for example, plastic, rubber, etc. Signal conductor 580 is a metallic or other electrical conducting material for carrying electrical current, signals, data, messages, and the like. Shield conductor 584 acts as a shield to protect the current, signals, data, messages, or otherwise, as flowing on signal conductor 580, from interference. Shielded coaxial communication cable 590 also includes a jacket 586 which generally covers and/or protects shield conductor 584. It is to be understood that the shielded coaxial communication cable of FIG. 5*b* is provided as an example and that various other embodiments of shielded coaxial communication cable(s) may be used in accordance with the disclosures herein.

FIG. 6*a* illustrates an example network diagram 600 including an overcurrent monitoring system in accordance with the present disclosure. For example, an overcurrent monitoring system may be implemented via one or more server(s) 620. The servers(s) 620 may be operated by a provider of a communications network providing communication subscriber services (e.g., cable television, Internet, digital telephone, digital data, etc.) to one or more subscriber service points 630. Such services may be provided via a network (e.g., network 604) that may include or use, at least in part, one or more shielded coaxial communication cables, such as those described herein, for a variety of applications, such as providing communication subscriber services by connecting provider's service point(s) (e.g., server(s) 620), with user/subscriber service points/equipment 630-635.

Figure 6B:
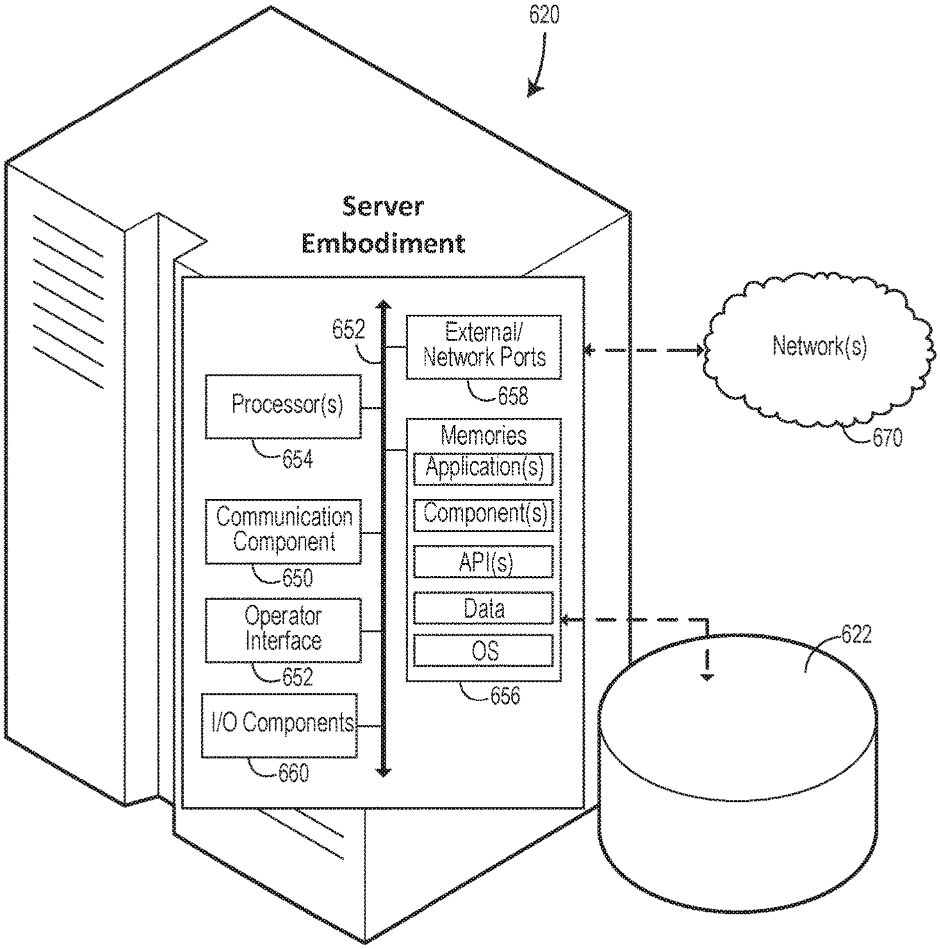

The server(s) 620 may include one or more processor(s), one or more computer memories, one or more networking ports, and/or other computing modules or components as described, for example, for FIG. 6*b* herein. The server(s) 620 may implement one or many operating systems such as Microsoft Windows, Linux, UNIX, or the like. In one embodiment, the overcurrent monitoring system could be accessed, managed, administered, or operated by an operator or an administrator (e.g., such as an operator or administrator of the provider's communication network) via a one or more computing devices 640, for example, accessible via one or more networks 670, which may include a private network (not shown) or network 604, which may include the Internet, cable network, or similar network for communication subscriber services described herein. In other embodiments, the overcurrent monitoring system could be accessed, managed, administered, or operated by the operator or administrator remotely, such as via network 604.

The server(s) 620 may provide several cable and/or Internet services, where the server(s) 620 operate as a cable service provider "headend" (e.g., a communication subscriber service provider's local distribution facility) and/or an Internet service provider (ISP) for delivery of cable television, Internet, digital telephone, digital data, etc. to subscriber service points and equipment (e.g., subscriber equipment 630-635 described herein). For example, for cable services, the server(s) 620 may act as a headend facility. The headend may distribute cable channels or signal via one or more distribution hubs (not shown) of network 604. The distribution hubs (not shown) may distribute the cable channels are signals to user/subscriber service points/equipment 630-635.

The server(s) 620 may also implement several client-server platforms, such as ASP.NET, Java J2EE, Ruby on Rails, Node.js, or other client-server platform or technology to allow the server(s) to receive and respond to network requests, such as requests for data values from (or to push such data values to) an overcurrent monitoring application (app) as described herein for FIG. 7.

Similarly, the server(s) 620 may expose one or more network-based application programming interfaces (APIs), including, for example, a web service based API or a representation state transfer (RESTful) API to receive network based API requests from remote devices and provide respective responses.

In addition, the server(s) 620 may also be configured to receive one or more data values from overcurrent devices or circuits (e.g., each implemented as described for overcurrent device 502 of FIG. 5*a* and/or overcurrent circuit 100 of FIG. 1). For example, as shown for FIG. 6*a*, overcurrent devices 602, 612, 614, and 616 are each installed, connected to, are operating with, or are otherwise associated with network 604 to detect or prevent overcurrent in network 604. Such overcurrent devices 602, 612, 614, and 616 may be installed at various locations within network 604, and may transmit one or more data values to server(s) 620 as described herein.

In some embodiments, the one or more data values received from, and transmitted by, the overcurrent devices 602, 612, 614, and 616, may be stored in the one or memories of the server(s) 620, which may include or be structured via, for example, one or more database(s) 622. The one or more database(s) 622 may be implemented, for example, as any of one or more relational database(s) (e.g., via Oracle DB, IBM DB2, MySQL, etc.) and/or as one or more NoSQL database(s), e.g., via MongoDB.

In some embodiments, the one or more data values, status values, or visualizations thereof, may be retrieved by and/or visualized by computing devices 640. Computing devices 640 may be computing devices of any of the operator/provider, user/subscriber, or other person associated with the communication subscriber servicers associated with network 604. Computing devices 640 may include, for example, any one or more of various tablet devices 642, mobile phones 644, smart phones 646, or other computer devices, such as laptop 648 and/or personal computer 649. Computing devices 640 may implement a variety of operating systems, including, for example, Apple iOS, Google Android, Microsoft Windows, MacOS, etc. The computing devices 640 may receive information (e.g., data values, status, etc.) via wired or wireless communication either from network 604 or from a network associated with server(s) 620. For example, in some embodiments, wireless communication may be based on the IEEE 802.11 standard (WiFi) standard or Bluetooth standard. In other embodiments, the wireless communication may be based on one or more cellular standards such as GSM, CDMA, UMTS, LTE, where a base station may be, for example, a cellular base station or tower that may receive and respond to the computing devices 640 wireless communication via cellular transceivers in respective computing devices 640.

Network diagram 600 also depicts example subscriber service points 630 and example user equipment 633 and 635. As shown in the embodiment of FIG. 6*a*, the subscriber service points 630 includes a subscriber set-top box 632, which may have been provided or supplied by the provider of the communication subscriber services (e.g., operator of server(s) 620). Subscriber set-top box 632 is connected to television 633, which may be used to display cable content delivered from the provider of the communication subscriber services (e.g., associated with servers(s) 620) via network 604. The subscriber service points 630 also includes a subscriber modem 634, which may also have been provided or supplied by the provider of the communication subscriber services (e.g., operator of server(s) 620). Subscriber modem 634 is connected to subscriber computer 635 which may be used to access internet services via network 604 provided by the provider (e.g., the operator of server(s) 620). The subscriber service points 630 also include a subscriber computer or other computing device 636 that is owned or operated by the subscriber, third-party, etc.

In the embodiment of FIG. 6*a*, overcurrent devices 612, 614, 616 are operating with shielded coaxial communication cables in network 604, as depicted between the provider servers(s) 620 and subscriber service points 630, which include subscriber set-top box 632, modem 634, and computing device 636, respectively. The overcurrent devices 612, 614, 616 may be installed at various locations in the network 604, including, for example, within the subscriber's building, facility, home, or other locations where communication subscriber services (e.g., cable television, Internet, digital telephone, digital data, etc.) are provided via shielded coaxial communication cables as described herein. Thus, the overcurrent devices 612, 614, 616 provide protection (e.g., fire and damage protection) for the buildings, facilities, structures, networks, and/or otherwise areas having shielded coaxial communication cables, where such overcurrent devices 612, 614, 616 may be placed in, placed without, or otherwise integrated with such buildings, facilities, structures, networks, and/or areas employing shielded coaxial communication cables.

Similarly, an additional overcurrent device 602 is operating upstream of the overcurrent devices 612-616, but also between the provider servers(s) 620 and subscriber service points 630. In some embodiments, the overcurrent device 602 may installed in network 604 between a provider's facilities (e.g., with server(s) 620) and the subscriber's facilities (e.g., with subscriber service points 630). In other embodiments, the overcurrent device 602 may installed at the provider's facilities. Thus, the overcurrent devices 602 provides protection (e.g., fire and damage protection) for the buildings and facilities with shielded coaxial communication cables within which it is located.

In various embodiments, any of the overcurrent devices 602 and/or 612-116 may operate, as described herein, to prevent overcurrent from flowing through shield conductors and/or signal conductors of the shielded coaxial communication cables of network 604, and, thus, may prevent damage to the shielded coaxial communication cables and the facilities in which they are installed. In is to be understood that additional overcurrent devices (not shown) may be installed at various other locations (not shown) in network 604 to provide overcurrent protection as described herein.

In an embodiment, the overcurrent monitoring system network diagram 600 may protect and/or monitor overcurrent in shielded coaxial communication cables using the overcurrent devices 602 and/or 612-116. As described herein, each of the overcurrent devices 602 and/or 612-116 may be configured to operate at one or more locations in a network 604. The overcurrent devices 602 and/or 612-116 may each include respective shield breaking elements and signal breaking elements as described herein, e.g., for FIGS. 1-5*a*. Each of the overcurrent devices 602 and/or 612-116 may also include a microprocessor that is electronically connected to each respective shield breaking element and signal breaking element of the overcurrent devices 602 and/or 612-116. Further, each microprocessor of the overcurrent devices 602 and/or 612-116 may be connected to a respective transmitter also of each of the overcurrent devices 602 and/or 612-116.

As described with respect to certain embodiments, each microprocessor of each of the overcurrent devices 602 and/or 612-116 may be configured to transmit, via its respective transmitter, and to the network 604, one or more data values. The data values may be associated with a first electrical current (e.g., flowing through shield conductors of one or more shielded coaxial communication cables connected to overcurrent devices 602 and/or 612-116 of network 604) and/or the second electrical current (e.g., flowing through signal conductors of one or more shielded coaxial communication cables connected to overcurrent devices 602 and/or 612-116 of network 604). The data values may be or represent an analog or digital sampling of the first and/or second electrical circuit.

In some embodiments, the one or more data values may be received by the server(s) 620 from the overcurrent devices 602 and/or 612-116. The server may be further configured to determine, via its processors, and based on the one or more data values, that an occurrence of an overcurrent event has been experienced by at least one of the one or more overcurrent devices 602 and/or 612-116, and, thus, by their respective overcurrent circuits contained therein, of network 604.

As described herein, the server(s) 620 may be operable to store the one or more data values in the memory of the server, including, for example, database(s) 622.

In another embodiment, the server(s) 620 may be configured to generate an alert based on the determination of an occurrence of the overcurrent event at any one of the overcurrent devices 602 and/or 612-116. In certain embodiments, the alert may include an overcurrent location of the overcurrent devices 602 and/or 612-116. For example, an overcurrent location may identify where in network 604 the occurrence of the overcurrent event occurred, such as the location of the overcurrent devices 602 and/or 612-116, and, thus, their respective overcurrent circuits, and related shielded coaxial communication cables and/or other related equipment or components in the vicinity of the identified location(s). The locations may be based on the identification of the overcurrent devices 602 and/or 612-116, and, the respective, known locations of the overcurrent devices 602 and/or 612-116.

FIG. 6*b* illustrates an embodiment of a server(s) 620 of the overcurrent monitoring system of FIG. 6*a*. As illustrated in FIG. 6*b*, server(s) 620 may be a computing device that may include one or more processor(s) 654 as well as one or more computer memories 656. The memories 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memories 656 may store an operating system (OS) (e.g., Microsoft Windows, Linux, UNIX, etc.) capable of facilitating the functionalities as discussed herein. The memories 656 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, the component(s) for receiving, visualizing, and/or other manipulating the one or more data values as descried herein. It should be appreciated that one or more other applications may be envisioned and that are executed by the processor(s) 654.

The processor(s) 654 may be connected to the memories 656 via a computer bus 652 responsible for transmitting electronic data, data packets, or otherwise electronic signals to and from the processor(s) 654 and memories 656 in order to implement or perform the machine readable instructions, methods, processes, elements or limitations, as illustrated, depicted, or described for the various flowcharts, illustrations, diagrams, figures, and/or other disclosure herein. For example, computer bus 652 may be part of one or more motherboards of server(s) 620.

The processor(s) 654 may interface with the memory 656 via the computer bus 652 to execute the operating system (OS). The processor(s) 654 may also interface with the memory 656 via the computer bus 652 to create, read, update, delete, or otherwise access or interact with the data stored in the memories 656 and/or the database(s) 622 (e.g., a relational database, such as Oracle, DB2, MySQL, or a NoSQL based database, such as MongoDB). The data stored in the memories 656 and/or the database(s) 622 may include all or part of any of the data or information described herein, including, for example, the one or more data values as received from overcurrent devices 602 and/or 612-116.

The server(s) 620 may further include a communication component 650 configured to communicate (e.g., send and receive) data via one or more external/network port(s) 658 to one or more networks, such as computer network 604 and/or networks associated with computing devices 640 described herein. In some embodiments, the communication component 650 may include a client-server platform technology such as ASP.NET, Java J2EE, Ruby on Rails, Node.js, a web service or online API, responsive for receiving and responding to electronic requests. The processor(s) 654 may implement the communication component 650 that may interact, via the computer bus 652, with the memories 656 (including the applications(s), component(s), API(s), data, etc. stored therein) and/or database(s) 622 to implement or perform the machine readable instructions, methods, processes, elements or limitations, as illustrated, depicted, or described for the various flowcharts, illustrations, diagrams, figures, and/or other disclosure herein. According to some embodiments, the communication component 650 may include, or interact with, one or more transceivers (e.g., WWAN, WLAN, and/or WPAN transceivers) functioning in accordance with IEEE standards, 3GPP standards, or other standards, and that may be used in receipt and transmission of data via the external/network port(s) 658.

The server(s) 620 may further facilitate television channels or transmission by acting as a headend and/or providing frequently division multiplexing to deliver television or cable content to various subscriber service points, e.g., subscriber service points 630 described herein.

The server(s) 620 may further include or implement an operator interface 652 configured to present information to an administrator or operator (e.g., the provider of the communications network of FIG. 6*a*) and/or receive inputs from the administrator or operator. As shown in FIG. 6*b*, the operator interface 652 may provide a display screen (e.g., via a computing devices 640). The server(s) 620 may also provide I/O components 660 (e.g., ports, capacitive or resistive touch sensitive input panels, keys, buttons, lights, LEDs), which may be directly accessible via or attached to server(s) 620 or may be indirectly accessible via or attached to any of computing devices 640. According to some embodiments, an administrator or operator may access the server(s) 620 via the operator interface 652 and/or I/O components 660 to review information, make changes, input training data, and/or perform other functions.

In some embodiments, the server(s) 620 may perform the functionalities as discussed herein as part of a "cloud" network or may otherwise communicate with other hardware or software components within the cloud to send, retrieve, or otherwise analyze data or information described herein.

In general, a computer program or computer based product in accordance with some embodiments may include a computer usable storage medium, or tangible, non-transitory computer-readable medium (e.g., standard random access memory (RAM), an optical disc, a universal serial bus (USB) drive, or the like) having computer-readable program code or computer instructions embodied therein, wherein the computer-readable program code or computer instructions may be installed on or otherwise adapted to be executed by the processor(s) 654 (e.g., working in connection with the respective operating system in memories 656) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, Actionscript, JavaScript, HTML, CSS, XML, etc.).

FIG. 7 illustrates an embodiment of a computing device 640 executing an overcurrent monitoring application (app) 702 in accordance with the present disclosure. In various embodiments, the overcurrent monitoring app may be implemented on one or more operating systems, including, for example, Apple iOS, Google Android, Microsoft Windows, MacOS, etc., and may be implemented in a variety of programming languages include Objective-C, Swift, Java, or the like. The embodiment of FIG. 7 depicts, for example, a smart phone 646 based embodiment.

The computing device 640 of FIG. 7 may receive information (e.g., one or more data values, status values based on the one or more data values, etc.) via wired or wireless communication from network 604 or from a network associated with server(s) 620. For example, an embodiment server(s) 620 may be configured to visualize the one or more data values via a computing devices 640. In such an embodiment, for example, the server may process the one or more data values and provide visualizations (e.g., via webpages, via an app interface, API, etc.) provided to a computing devices 640. For example, as shown in FIG. 7, one visualization may include an overcurrent monitoring graph 704. Overcurrent monitoring graph 704 may include a two-dimensional graph showing the one or more data values of a current 706 (A) plotted over time (t). The data values may have been provided from server(s) 620 and/or the overcurrent devices 602 and/or 612-116. The current 706 could be a current flowing through any one or more of the shielded coaxial communication cables of network 604, as measured, tracked, and/or transmitted by overcurrent devices 602 and/or 612-116 as described herein. For example, the current 706 could represent or be associated with a current flowing through one or more shield conductors, signal conductors, shield breaking elements, signal breaking elements, or other related components described herein, which are part of and/or are associated with overcurrent devices 602 and/or 612-116 of network 604 as described herein. For example, at least in one embodiment, current 706 could depict continuous overcurrent event(s), for example a graphical representation of the continuous overcurrent event(s), as experienced over time by an overcurrent device or overcurrent circuit described herein. In the example of FIG. 7, the current 706 depicts two overcurrent event occurrences 711 and 712. For example, at a first time, the overcurrent monitoring current app 702 detected, as shown via overcurrent monitoring graph 704, a first occurrence of an overcurrent event 711 experienced by at least one of the overcurrent devices 602 and/or 612-116 described herein. Similarly, at a second time, the overcurrent monitoring app 702 detected, as shown in overcurrent monitoring graph 704, a second occurrence of an overcurrent event 712 experienced by at least one of the overcurrent devices 602 and/or 612-116 described herein. Thus, server(s) 620, or the computing devices 640 itself, may visualize to users and/or operators, via computing devices 640, the one or more data values via overcurrent monitoring graph 704, including overcurrent event occurrences 711 and 712 experienced by overcurrent devices 602 and/or 612-116, and their respective shielded coaxial communication cables, of network 604.

In additional embodiments, and as illustrated by FIG. 7, the computing devices 640 may be operable to provide status values of the one or more overcurrent devices 602 and/or 612-116, and there related circuits. Such status values may be determined from the one or more data values transmitted by the one or more overcurrent devices 602 and/or 612-116. For example, as shown in FIG. 7, status values 720, including 722-730, may be provided via the overcurrent monitoring current app 702. In the embodiment of FIG. 7, a status value may include the number of overcurrent events detected 722. For example, the two overcurrent event occurrences 711 and 712 may have been stored by server(s) 620 and reported via overcurrent monitoring app 702 via status value 722.

Another status value is a location of overcurrent event 724, which may be a location of one or more overcurrent devices 602 and/or 612-116 in the network 604. For example, overcurrent monitoring app 702 shows example locations (or identifiers "602, 612" that identify specific locations) of specific overcurrent devices 602 and 614 of network 604.

In the embodiment of FIG. 7, other status values include the running time 726 of overcurrent monitoring app 702 (e.g., 25.46 days), indicating the uptime of the overcurrent monitoring app 702 (which may be stopped or started, for example, by an operator of communication subscriber services, user, or other personnel described herein).

A further status value may include the number of reports 728 made regarding overcurrent issues. In the embodiment of FIG. 7, one such report may have been initiated, for example, upon the occurrence of either of the overcurrent event occurrences 711 and 712.

A further status value may include an alert status 730. In one embodiment, the alert status may indicate the status of the current 706, where, in the present embodiment, the status is "Normal Operation" at the time depicted for overcurrent monitoring graph 704. In other embodiments, at either the times of either overcurrent event occurrences 711 and 712, the alert status may be "Overcurrent 602" and/or "Overcurrent 612" indicating that overcurrent events were occurring in overcurrent devices 602 and 614, respectively.

In a still further embodiment, the alert status 730 may indicate an overall or partial status of network 604, where "Normal Operation" may indicated that the overcurrent in network 604 is at a sufficient (low) level, for example, below a threshold or value that would cause any of the overcurrent devices 602 and/or 612-116 from activating thereby opening their respective shield breaking element and/or signal breaking elements as described herein.

Additional Considerations

The foregoing examples have been provided merely for the purpose of explanation and are in no way to be construed as limiting of the circuit disclosed herein. While the circuit, devices, and/or other disclosure have been described with reference to various embodiments, it is understood that the words, which have been used herein, are words of description and illustration, rather than words of limitation.

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A device for preventing overcurrent in one or more shielded coaxial communication cables, the device comprising:

an input element having a shield input and a signal input, the input element adapted to receive a first shielded coaxial communication cable having a first shield conductor and a first signal conductor;

an output element having a shield output and a signal output, the output element adapted to receive a second shielded coaxial communication cable having a second shield conductor and a second signal conductor;

a shield breaking element coupled between the shield input of the input element and the shield output of the output element, the shield breaking element configured for electrical connection in series between the first shield conductor of the first shielded coaxial communication cable and the second shield conductor of the second shielded coaxial communication cable;

a signal breaking element coupled between the signal input of the input element and the signal output of the output element, the signal breaking element configured for electrical connection in series between the first signal conductor of the first shielded coaxial communication cable and the second signal conductor of the second shielded coaxial communication cable and;

an interlocking element communicatively coupled between the shield breaking element and the signal breaking element, wherein the shield breaking element is configured to open upon conducting a first electrical current that exceeds an overcurrent threshold, the opening of the shield breaking element configured to prevent the first electrical current from flowing through the first shield conductor of the first shielded coaxial communication cable and the second shield conductor of the second shielded coaxial communication cable, and wherein the signal breaking element is configured to open upon activation of the interlocking element when the shield breaking element opens, the opening of the signal breaking element configured to prevent a second electrical current from flowing through the first signal conductor of the first shielded coaxial communication cable and the second signal conductor of the second shielded coaxial communication cable.

2. The device of claim 1 further comprising:

a notification element, the notification element configured to indicate at least one of the opening of the shield breaking element or the opening of the signal breaking element.

3. The device of claim 2 wherein the notification element includes at least one of a visual indicating element, a mechanical indicating element, an electrical indicating element, or an electromagnetic indicating element.

4. The device of claim 1 further comprising:

a conductive case configured to at least partially contain the shield breaking element and the signal breaking element, wherein the conductive case at least partially exposes the output element for receiving the second shielded coaxial communication cable, wherein the conductive case at least partially exposes the input element for receiving the first shielded coaxial communication cable, and wherein the conductive case is electrically connected to the shield input or the shield output.

5. The device of claim 1 further comprising:

a signal processing circuit electrically connected in series with the first shielded coaxial communication cable and the second shielded coaxial communication cable, wherein the signal processing circuit is configured to provide at least one of signal amplification, signal attenuation, impedance matching, or protocol conversion to a signal passing from the first shielded coaxial communication cable to the second shielded coaxial communication cable.

6. The device of claim 1 further comprising:

an second output element having a second shield output and a second signal output, the second output element adapted to receive a third shielded coaxial communication cable having a third shield conductor and a third signal conductor; and a splitter circuit electrically connected in series with the shield breaking element and the signal breaking element, wherein splitter circuit receives a signal from the first shielded coaxial communication cable and transmits the signal to each of the second shielded coaxial communication cable and the third coaxial shielded communication.

7. The device of claim 6 wherein, the splitter processing circuit is configured to provide at least one of signal amplification, signal attenuation, impedance matching, or protocol conversion to the signal.

8. The device of claim 1 further comprising:

a microprocessor electronically connected to each of the shield breaking element and the signal breaking element; and a transmitter electronically connected to the microprocessor, wherein the microprocessor is configured to transmit, via the transmitter to a network, one or more data values, the one or more data values associated with the first electrical current or the second electrical current.

9. The device of claim 8, wherein the one or more data values are operable to be received by one or more remote processors, the one or more remote processors configured to generate an alert upon determining, based on one or more data values, that either the shield breaking element has opened or the signal breaking element has opened.

10. The device of claim 8, wherein the one or more data values are operable to be received by one or more remote processors, the remote processors configured to visualize, based on the one more data values, on a display a representation of overcurrent events associated with either the first electrical current or the second electrical current.

11. The device of claim 8, wherein the one or more data values are operable to be received by one or more remote processors, the remote processors configured to store the one or more data values in a remote storage device.

12. The device of claim 11, wherein the one or more remote processors are further configured to visualize on the display status values, the status values determined from the one or more data values.

13. An overcurrent monitoring system for monitoring overcurrent in one or more shielded coaxial communication cables, the overcurrent monitoring system comprising:

one or more overcurrent circuit devices configured to operate at one or more locations in a network, each overcurrent circuit device comprising:

an output element having a shield output and a signal output, the output element adapted to receive a second shielded coaxial communication cable having a second shield conductor and a second signal conductor, a shield breaking element coupled between the shield input of the input element and the shield output of the output element, the shield breaking element configured for electrical connection in series between the first shield conductor of the first shielded coaxial communication cable and the second shield conductor of the second shielded coaxial communication cable, a signal breaking element coupled between the signal input of the input element and the signal output of the output element, the signal breaking element configured for electrical connection in series between the first signal conductor of the first shielded coaxial communication cable and the second signal conductor of the second shielded coaxial communication cable, and an interlocking element communicatively coupled between the shield breaking element and the signal breaking element, wherein the shield breaking element is configured to open upon conducting a first electrical current that exceeds an overcurrent threshold, the opening of the shield breaking element configured to prevent the first electrical current from flowing through the first shield conductor of the first shielded coaxial communication cable and the second shield conductor of the second shielded coaxial communication cable, and wherein the signal breaking element is configured to open upon activation of the interlocking element when the shield breaking element opens, the opening of the signal breaking element configured to prevent a second electrical current from flowing through the first signal conductor of the first shielded coaxial communication cable and the second signal conductor of the second shielded coaxial communication cable:

a microprocessor electronically connected to each of the shield breaking element and the signal breaking element;

a transmitter electronically connected to the microprocessor, wherein the microprocessor is configured to transmit, via the transmitter to the network, one or more data values, the one or more data values associated with the first electrical current or the second electrical current; and a server, the server including one or more processors and one or more memories, the server configured to receive the one or more data values transmitted by the one or more overcurrent circuits via the network, wherein the server is further configured to determine, based on the one or more data values, an occurrence of an overcurrent event experienced by at least one of the one or more overcurrent circuits.

14. The overcurrent monitoring system of claim 13, wherein the server is operable to store the one or more data values in the one or more memories of the server.

15. The overcurrent monitoring system of claim 13, wherein the server is configured to generate an alert based on the determination of the occurrence of the overcurrent event.

16. The overcurrent monitoring system of claim 14, wherein the alert includes an overcurrent location from the one or more locations, the overcurrent location identifying the one or more overcurrent circuit devices associated with the occurrence of the overcurrent.

17. The overcurrent monitoring system of claim 13, wherein the server is configured to visualize the one or more data values via a computing device.

18. The overcurrent monitoring system of claim 17, wherein the computing device is operable to provide status values of the one or more overcurrent circuit devices, the status values determined from the one or more data values.

19. The overcurrent device of claim 1, wherein the overcurrent threshold is adjustable.

20. The overcurrent device of claim 1, wherein the overcurrent threshold is adjusted to a value between 0.1 to 10 amperes.

21. The overcurrent device of claim 1, wherein the overcurrent threshold is predefined.

22. The overcurrent device of claim 1, wherein the signal breaking element is contained within a conductive case, the conductive case electrically connected to the shield input or the shield output.

23. A device for preventing overcurrent in one or more shielded coaxial communication cables, the device comprising:

an input element having a shield input and a signal input, the input element adapted to receive a first shielded coaxial communication cable having a first shield conductor and a first signal conductor;

an output element having a shield output and a signal output, the output element adapted to receive a second shielded coaxial communication cable having a second shield conductor and a second signal conductor;

a shield breaking element coupled between the shield input of the input element and the shield output of the output element, the shield breaking element configured for electrical connection in series between the first shield conductor of the first shielded coaxial communication cable and the second shield conductor of the second shielded coaxial communication cable; and a signal breaking element coupled between the signal input of the input element and the signal output of the output element, the signal breaking element configured for electrical connection in series between the first signal conductor of the first shielded coaxial communication cable and the second signal conductor of the second shielded coaxial communication cable, wherein the shield breaking element is configured to open upon conducting a first electrical current that exceeds an overcurrent threshold, the opening of the shield breaking element configured to prevent the first electrical current from flowing through the first shield conductor of the first shielded coaxial communication cable and the second shield conductor of the second shielded coaxial communication cable, wherein the signal breaking element is configured to open when the shield breaking element opens, the opening of the signal breaking element configured to prevent a second electrical current from flowing through the first signal conductor of the first shielded coaxial communication cable and the second signal conductor of the second shielded coaxial communication cable, and wherein the overcurrent threshold is adjustable.

24. The overcurrent device of claim 23, wherein the overcurrent threshold is adjusted to a value between 0.1 to 10 amperes.

* * * * *